United States Patent [19]

Iwanaga et al.

[11] Patent Number: 5,349,456
[45] Date of Patent: Sep. 20, 1994

[54] SUBSTRATE HAVING AN ACTIVE ELEMENT ARRAY WITH LOW HYDROXYL AND CHLORINE

[75] Inventors: Toshihiko Iwanaga; Kazuyoshi Yoshida, both of Kanagawa; Takusei Sato, Kagoshima, all of Japan

[73] Assignee: Sony Corporation, Japan

[21] Appl. No.: 9,677

[22] Filed: Jan. 27, 1993

[30] Foreign Application Priority Data

Jan. 31, 1992 [JP] Japan ................. 4-042080
Jun. 19, 1992 [JP] Japan ................. 4-186057

[51] Int. Cl.$^5$ ............................ G02F 1/1333
[52] U.S. Cl. ........................ 359/82; 359/62; 501/900; 501/54
[58] Field of Search ............ 65/4, 18.1, 3.12, 18.2; 428/34.4; 423/335; 359/82, 58, 59, 62; 257/350, 352; 501/54, 900

[56] References Cited

U.S. PATENT DOCUMENTS

| | | | |
|---|---|---|---|
| 3,925,583 | 12/1975 | Rau et al. | 428/36 |
| 4,406,680 | 9/1983 | Edahiro et al. | 65/18.2 |
| 4,432,781 | 2/1984 | Okamoto et al. | 65/18.2 |
| 4,501,993 | 2/1985 | Mueller et al. | 315/248 |
| 4,564,378 | 1/1986 | Kuisl | 65/18.2 |
| 4,572,729 | 2/1986 | Lang et al. | 65/18.1 |
| 4,613,382 | 9/1986 | Katayama et al. | 148/1.5 |
| 4,676,964 | 6/1987 | Seki et al. | 423/334 |
| 4,942,441 | 7/1990 | Konishi et al. | 257/59 |
| 5,043,772 | 8/1991 | Yamazaki | 136/258 |
| 5,135,603 | 8/1992 | Baughman | 156/623 |
| 5,152,819 | 10/1992 | Blackwell et al. | 65/3.12 |

FOREIGN PATENT DOCUMENTS

| | | |
|---|---|---|
| 0385753 | 9/1990 | European Pat. Off. . |
| 0432831 | 6/1991 | European Pat. Off. . |
| 2166276 | 4/1986 | United Kingdom . |

OTHER PUBLICATIONS

Chemical Abstracts, vol. 113, No. 6, Aug. 6, 1990, Columbus, Ohio US; Abstract No. 45194j, Yokogawa "Ultraviolet Radiation-Resistent Synthetic Quartz Glass and Its Manufacture", p. 276; & JP-A-280 343.

*Primary Examiner*—William L. Sikes
*Assistant Examiner*—Kenneth Parker
*Attorney, Agent, or Firm*—Hill, Steadman & Simpson

[57] ABSTRACT

A synthetic quartz glass substrate (1) supporting active elements is formed of high-purity synthetic quartz glass having, a hydroxyl group content of 200 ppm or below and chlorine group content of 50 ppm or below. The substrate (1) may have an impurity level of 1 ppm or less sodium and 1 ppm or less aluminum. TFTs (6), i.e., active elements, and picture element electrodes (7) are formed on the surface of the synthetic quartz glass substrate (1) to construct a driving panel for a liquid crystal display of an active matrix type. A liquid crystal panel is formed by disposing the driving panel and a counter substrate (2) opposite to each other and sandwiching a liquid crystal layer (3) between the driving panel and the counter substrate (2).

10 Claims, 5 Drawing Sheets

FIG. I

SUBSTRATE HAVING AN ACTIVE ELEMENT ARRAY WITH LOW HYDROXYL AND CHLORINE

BACKGROUND OF THE INVENTION

1. Field of the Invention

The present invention relates to a substrate having an active element array, comprising a quartz glass substrate and active elements formed on the quartz glass substrate, such as a TFT substrate for driving a liquid crystal display of an active matrix type, and, more specifically, to the composition of the quartz glass substrate.

2. Description of Related Art

The substrate having active element array has been used as a principal component of various devices. For example, a substrate having thin-film transistors (TFT substrate) provided with an integrated circuit of thin-film transistors, i.e., active elements, is used as a driving substrate for driving a liquid crystal display of an active matrix type. The display quality of the liquid crystal display is quite sensitive to the quality of the glass substrate of the TFT substrate, and the quality of the glass substrate influences the element fabricating process. Accordingly, improvement of techniques relating to the glass substrate is important for the development of liquid crystal displays. The requisite characteristics and quality of the glass substrate will be briefly described hereinafter.

First, the glass substrate must have a flat surface. The flatness of the surface of the glass substrate is deteriorated by warps, which are upward and downward flexures that appear in the surface of the glass substrate. If the glass substrate is warped, problems arise in fastening the glass substrate on a working table with a vacuum chuck and in patterning thin films by photolithography to form minute TFTs. If a liquid crystal display is provided with a substrate having an active element array using a warped glass substrate, unacceptable irregular distribution of color on the screen occurs.

The glass substrate must have high heat resistance. The maximum withstand temperature of the glass substrate, in general, is represented by the softening point. The softening point must be higher than the maximum process temperature in the liquid crystal display manufacturing processes. For example, in a process of manufacturing a semiconductor device for processing a polycrystalline silicon film to form TFTs, the process temperature is 1000° C. or higher. Therefore, the glass substrate must have high heat resistance. From such a point of view, a quartz glass substrate is used widely. The use of molten quartz glass is described, for example, in Nippon Gakujutsu Shinko-Kai Committee No. 142, "Handbook of Liquid Crystal Devices", Nikkan Kogyo-sha, p. 22, 1989.

The glass substrate must have high purity. If metal impurities contained in the glass substrate, such as alkaline components of the glass substrate, dissolve into liquid crystal cells, the resistivity of the liquid crystal is reduced and the display characteristics of the liquid crystal cell changes. If a small amount of alkaline components of the glass substrate dissolves into a functional film, such as a polycrystalline silicon film, in forming TFTs, the characteristics of the functional film may be deteriorated.

As is obvious from the foregoing explanation, a glass plate to be used as a substrate for supporting active elements must have high quality in respect of flatness, heat resistance and purity. To meet such requirements, quartz glass substrates are used. The characteristics of quartz glass is greatly dependent on the method of manufacturing quartz glass. Quartz glass is classified roughly into two kinds of quartz glass; natural quartz glass obtained by melting natural quartz at high temperature and casting the molten natural quartz, and synthetic quartz glass obtained by depositing source materials by a vapor deposition process, such as a CVD process, using $SiCl_4$, $H_2$ and $O_2$ as materials.

However, the prior art quartz glass is not necessarily satisfactory as a material for forming a substrate for supporting active elements in respect of high purity and high heat resistance. Although the molten quartz glass has a high softening point in the range of 1050° C. to 1100° C. meeting a required heat resistance, the molten quartz glass contains alkaline metal impurities, such as Na, K and Li, unavoidably, because the the molten quartz glass is obtained by melting natural quartz.

Although the synthetic quartz glass has very high purity, the heat resistance thereof is not satisfactory. A substrate of the synthetic quartz glass is subject to warping and deformation under high temperature.

Various measures have been proposed to improve the heat resistance of synthetic quartz glass. For example, a technique disclosed in Japanese Patent Laid-open (Kokai) No. Hei 3-193637 adds aluminum to high-purity synthetic quartz glass. However, the addition of an impurity to quartz originally consisting of pure $SiO_2$ requires complicated processes and the impurity may possibly cause adverse effect.

SUMMARY OF TEE INVENTION

In view of the foregoing problems in the prior art, it is an object of the present invention to provide a substrate for supporting active elements, formed of quartz glass having excellent heat resistance and high purity.

In one aspect of the present invention, a substrate having an active element array comprises a glass substrate, and active elements formed on the glass substrate, wherein the glass substrate is formed of high-purity synthetic quartz glass of 200 ppm or below in hydroxyl group content and 50 ppm or below in chlorine content.

This glass substrates enables stably forming TFTs in an integrated circuit thereon. An substrate having active element array or a TFT substrate thus formed can be used as a driving substrate for a liquid crystal display of an active matrix type.

The present invention limits the chlorine content of the synthetic quartz glass to 50 ppm or below, whereby the heat resistance of a glass substrate formed of the synthetic quartz glass is improved. The synthetic quartz glass is produced by, for example, a Verneuil process (direct process), using high-purity $SiCl_4$, $H_2$ and $O_2$. If chlorine contained in the material remains in the quartz glass, structural faults are formed in the Si-O bond. When the chlorine content of the synthetic quartz glass is suppressed to 50 ppm or below, structural faults are reduced and the heat resistance of the quartz glass is enhanced.

Similarly, the hydroxyl group content of the synthetic quartz glass is suppressed to 200 ppm or below. The hydroxyl group content of the synthetic quartz glass, in general, is dependent on the moisture content of the material. Reduction in the hydroxyl group content suppresses thermal warping.

As mentioned above, the synthetic quartz glass is produced by processing only high-purity process gases. The amounts of impurities, i.e., metals other than Si, contained in the synthetic quartz glass are very small. Accordingly, TFTs formed on the synthetic quartz glass substrate are not affected by impurities, so that the substrate having an active element array or the TFT substrate employing such a synthetic quartz glass substrate has stable electrical characteristics and high reliability.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
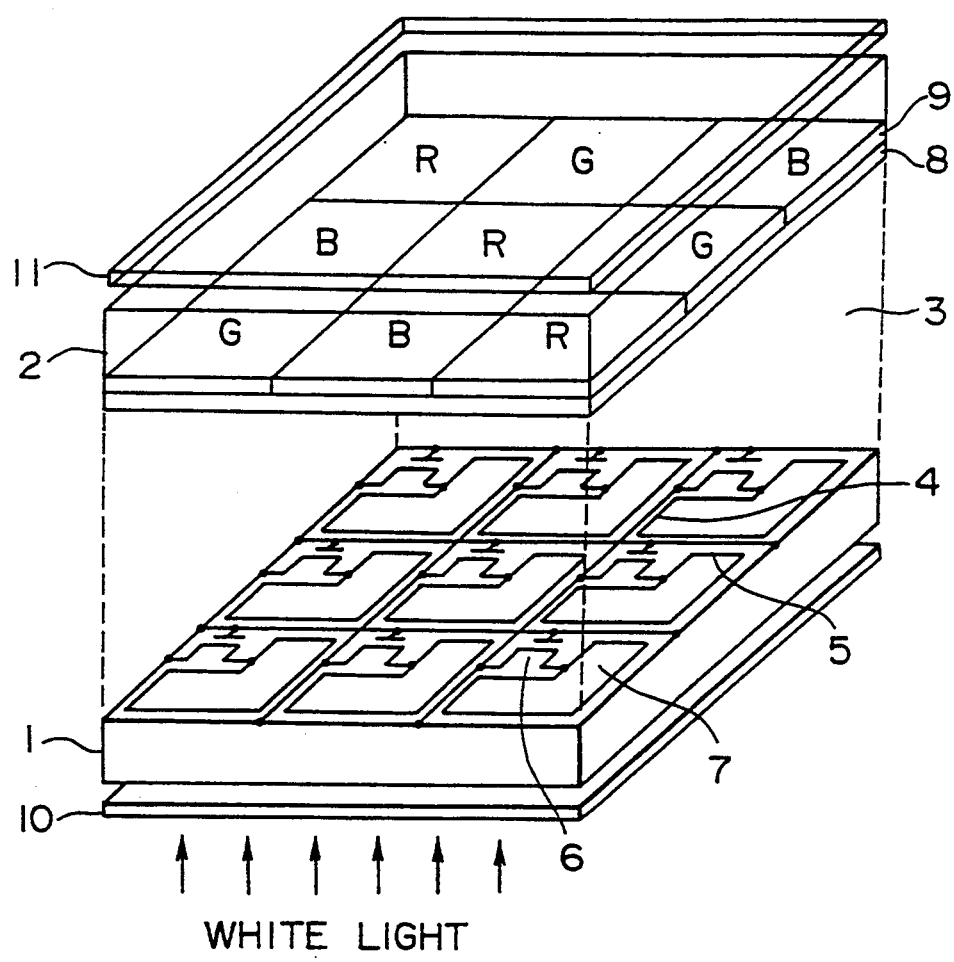
FIG. 1 is a schematic, exploded perspective view of a liquid crystal display incorporating a substrate having an active element array in accordance with the present invention.

Preferred embodiments of the present invention will be described hereinafter with reference to the accompanying drawings. FIG. 1 is a schematic, exploded perspective view of a liquid crystal display of an active matrix type employing a substrate having an active element array of the present invention as a driving substrate. As shown in FIG. 1, a synthetic quartz glass substrate 1 and a counter substrate 2 are disposed opposite to each other, and a liquid crystal layer 3 is sealed in the space between the synthetic quartz glass substrate 1 and the counter substrate 2. The lower synthetic quartz glass substrate 1 has a hydroxyl group content of 200 ppm or below and a chlorine content of 50 ppm or below. Data lines 4 and scanning lines 5 are formed in a grid on the surface of the synthetic quartz glass substrate 1, and TFTs 6 and picture element electrodes 7 are formed in squares formed by the intersecting data lines 4 and the scanning lines 5. Thus, the synthetic quartz glass substrate 1, the data lines 4, the scanning lines 5, the TFTs 6 and the picture element electrodes 7 form a TFT substrate, namely, a substrate having an active element array of the present invention. The TFTs 6 are selected individually through the scanning lines 5, and picture element signals are applied through the data lines 4 to the picture element electrodes 7, respectively.

A color filter film 9 and a counter electrode 8 are formed in that order on the inner surface of the upper counter substrate 2. The color filter film 9 has R (red), G (green) and B (blue) segments respectively corresponding to the picture element electrodes 7. The livid crystal panel thus constructed is sandwiched between two polarizing plates 100 and 11 to complete a transmission color display.

Table 1 shows the results of analysis of impurities contained in the synthetic quartz glass substrate 1, and of impurities contained in a molten quartz glass substrate as an comparative example.

TABLE 1

| Impurities | Content (ppm) | |
|---|---|---|
| | Synthetic quartz | Molten quartz |
| Al | 0.02 | 64.8 |
| P | <0.04 | <0.04 |
| B | <0.007 | 0.026 |
| Na | <0.02 | 1.9 |
| K | <0.02 | 0.04 |
| Li | <0.01 | 5.83 |
| Cl | <1 | <1 |

The amounts of al, P, B, Na, K, Li and Cl contained as impurities in the synthetic quartz substrate and the molten quartz glass substrates were measured. As is evident from Table 1, the impurity contents of the synthetic quartz glass substrate are smaller than those of the molten quartz glass substrate. Particularly, the amounts of the alkaline metals Na and Li which affect adversely to the electrical characteristics of the TFTs contained in the synthetic quartz glass substrate are very small, and the Cl content of the synthetic quartz glass substrate is as small as that of the molten quartz glass substrate. Although the Cl content of the sample synthetic quartz glass substrate is 1 ppm or below, it was found that the heat resistance of the synthetic quartz glass substrate can be significantly improved when the Cl content is 50 ppm or below.

Tables 2 and 3 show the hydroxyl group content of the synthetic quartz glass substrate 1 and that of the molten quartz glass substrate, respectively. Also shown in Tables 2 and 3 are the Al, Fe, Ca, Cu and Na contents of the synthetic quartz glass substrate 1 and the molten quartz glass substrate.

TABLE 2

| Elements | OH | Al | Fe | Ca | Cu | Na | Rest |
|---|---|---|---|---|---|---|---|
| Content (ppm) | 150 | 0.04 | 0.05 | 0.04 | — | — | 1 |

TABLE 3

| Elements | OH | Al | Fe | Ca | Cu | Na | Rest |
|---|---|---|---|---|---|---|---|
| Content (ppm) | 300 | 10 | 0.3 | 0.6 | 0.1 | 0.3 | 10 |

As is obvious from Table 2, the hydroxyl group content of 150 ppm of the synthetic quartz glass substrate 1 is smaller than 200 ppm, whereas the hydroxyl group content of 300 ppm of the molten quartz glass substrate is higher than 200 ppm. Since the molten quartz glass substrate is formed by casting molten natural quartz ,it is difficult to control the hydroxyl group content of the molten quartz glass substrate. On the other hand, the hydroxyl group content of the synthetic quartz glass substrate can be controlled to a value on the order of 50 ppm by controlling the synthesizing process.

A method of fabricating the liquid crystal display of an active matrix type shown in FIG. 1 will be described hereinafter. A synthetic quartz glass wafer having a hydroxyl group content of 200 ppm or below, a Cl content of 50 ppm or below, a diameter of 150 mm and a thickness of 1 mm or below, for example, 0.8 mm prepared. The surfaces of the synthetic quartz glass wafer are finished by precision grinding in a warp of 10 $\mu$m or below. A polycrystalline silicon film is formed over the entire surface of the synthetic quartz glass wafer by, for example, a CVD process. The polycrystalline silicon film is subjected to a semiconductor element fabricating process to form an integrated circuit of TFTs 6. A transparent conductive film formed over the surface of the synthetic quartz glass wafer is patterned to form picture element electrodes 7. Then, the surface of the synthetic quartz glass wafer is subjected to an orientation process. Then, the synthetic quartz glass wafer is scribed and divided into individual TFT chips.

A liquid crystal display of an active matrix type is assembled, using the TFT chips. In assembling the liquid crystal display of an active matrix type, the synthetic quartz glass substrate 1 and the counter substrate 2 are disposed opposite to each other and a liquid crystal layer 3 is sealed in the space between the synthetic quartz glass substrate 1 and the counter substrate 2.

Figure 2:
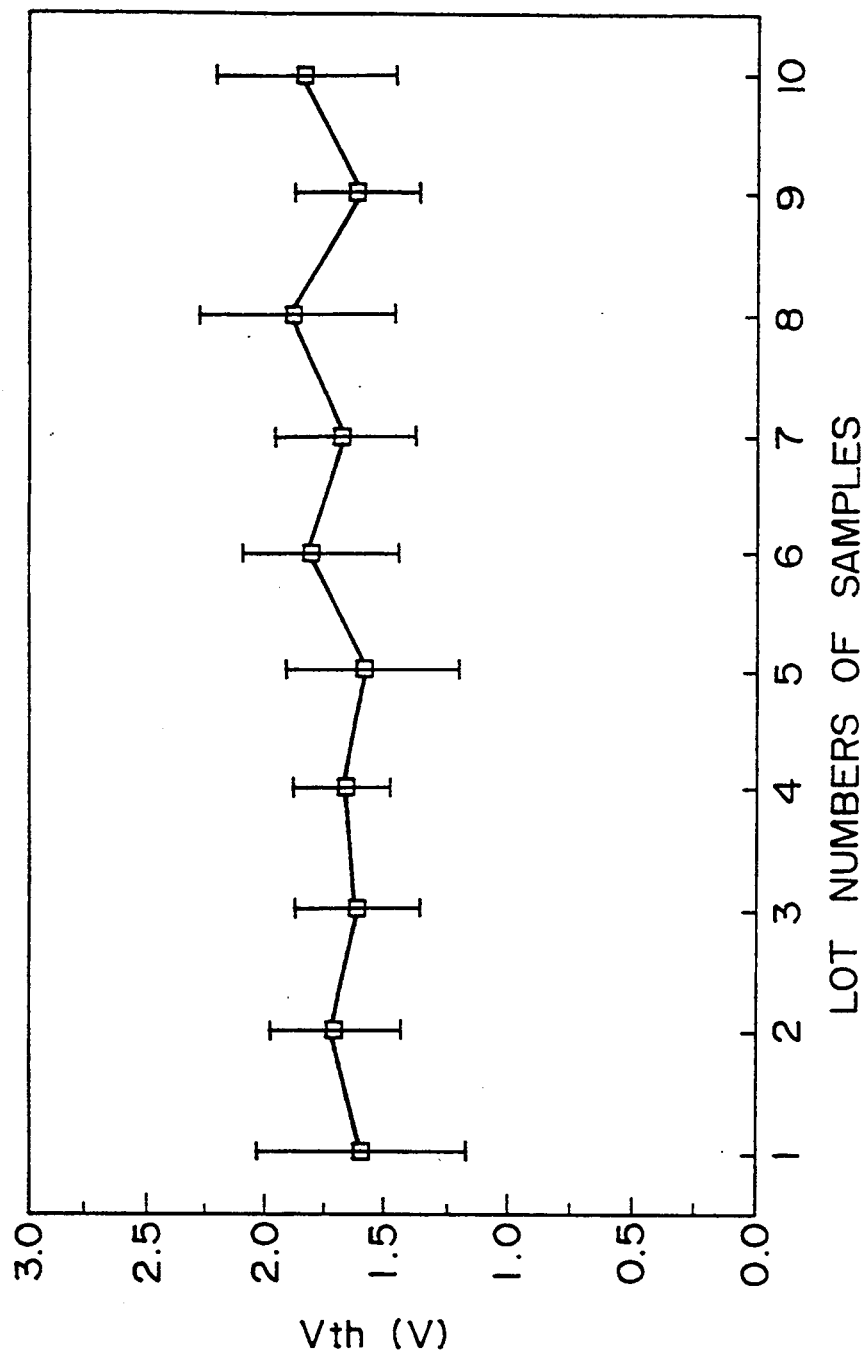
FIG. 2 is a graph showing the distribution of the threshold voltages Vth of TFTs formed on a substrate having an active element array in accordance with the present invention.

The electrical characteristics of sample liquid crystal displays thus fabricated were measured. The results of measurement are shown in FIG. 2, in which the threshold voltage Vth of the n-channel TFT is measured on the vertical axis and sample numbers are indicated on the horizontal axis. The distribution of the threshold voltages Vth of the samples of each lot is shown in FIG. 2. The between-lot mean threshold voltage was 1.70 V, and the between-lot dispersion was ±0.33 V. The dispersion of the threshold voltages Vth of the TFTs in each TFT chip was relatively small, and no faulty TFT was found. Image signals were applied to the sample liquid crystal displays to evaluate the quality of pictures displayed on the liquid crystal displays through the measurement of defective dots in pictures. The fraction defective of dots was as low as about 0.01% or below.

Figure 3:
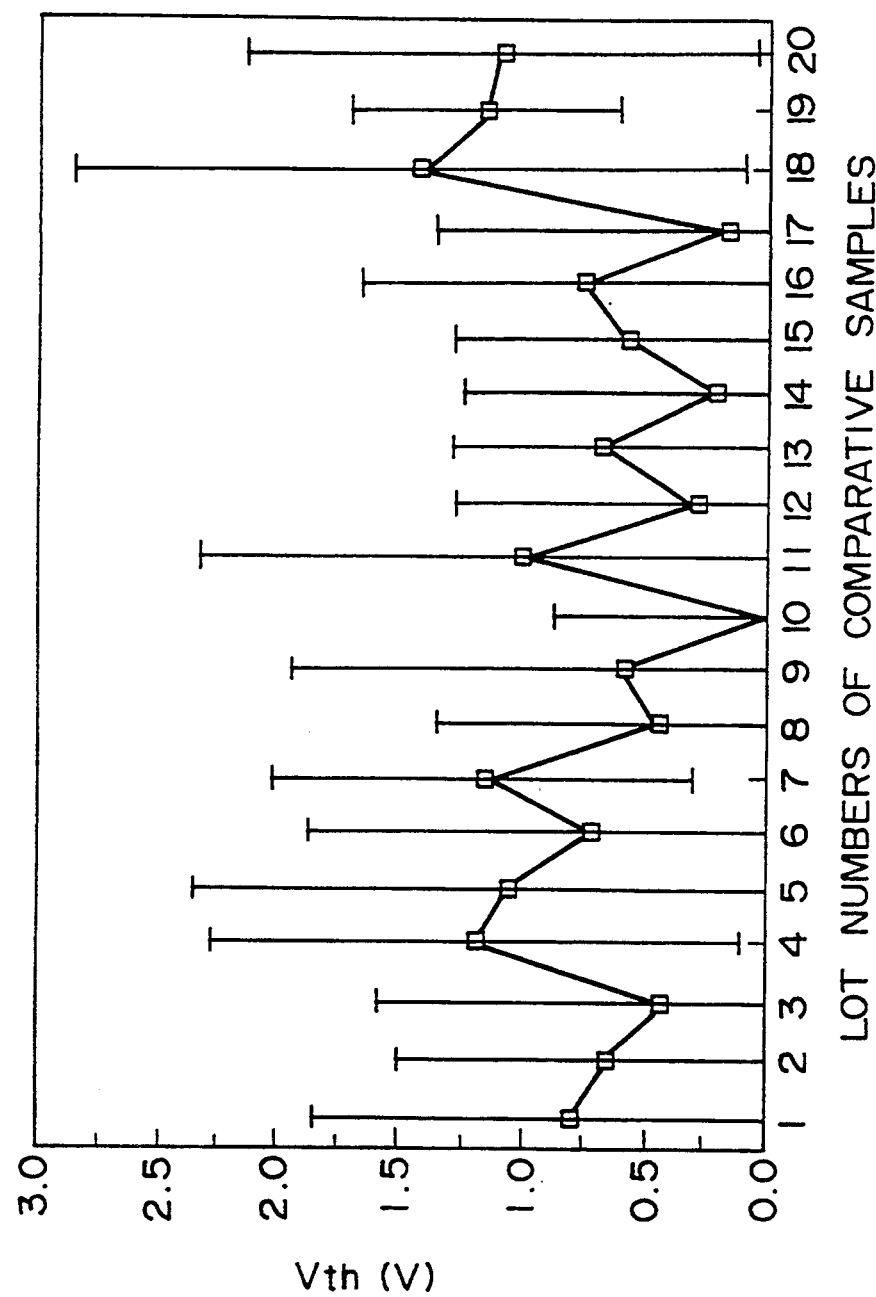
FIG. 3 is a graph showing the distribution of the threshold voltage Vth of TFTs formed on a prior art substrate having an active element array.

Results of measurement of the electrical characteristics of the liquid crystal displays in comparative samples are shown in FIG. 3, in which threshold voltage Vth is measured on the vertical axis and lot numbers are indicated on the horizontal axis. The comparative samples employ a conventional molten quartz glass substrate. As is obvious from FIG. 2, the between-lot dispersion of the threshold voltage Vth is as large as ±1.14 V, the dispersion of the threshold voltage Vth within each sample chip is large, and many defective TFTs were found. Image signals were applied to the liquid crystal displays and defective dots were measured. The fraction defective of dots was as large as 1% or above.

Figure 4:
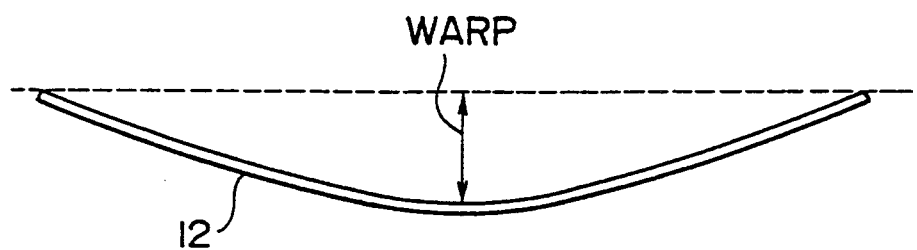
FIG. 4 is a diagrammatic view of assistance in explaining a method of measuring the warp of a wafer for fabricating a substrate having an active element array.

Finally, the thermal warping resistance of the synthetic quartz glass wafer was evaluated. The warp of the synthetic quartz glass wafer was measured by a tracer method. The principle of the tracer method is shown in FIG. 4. A probe was moved diametrically along the surface of a synthetic quartz glass wafer 12 of 150 mm in diameter through a distance of 130 mm. The warp of the synthetic quartz glass wafer is represented by the difference between the maximum height and the minimum height of the probe. The warp of the synthetic quartz glass wafer 12 finished by precision grinding was about 10 $\mu$m before forming TFTs thereon and was about 50 $\mu$m after forming TFTs. Thus, the change in flatness due to thermal history is relatively small, no trouble occurred during the fabrication of a TFT chips, and the yield of TFT chips was satisfactorily high.

The warp of the molten quartz glass wafer as a comparative sample was measured. The measured warp was about 10 $\mu$m before forming TFTs thereon and was about 70 $\mu$m after forming TFTs thereon. During the transportation of molten quartz glass wafer after forming TFTs thereon, troubles occurred once every fifth molten quartz glass wafers and the yield of the process was very low. If the warp is 60 $\mu$m or above, it is difficult to register the mask correctly for a photolithographic process, and many molten quartz glass wafers are rejected in the photolithographic process.

Figure 5:
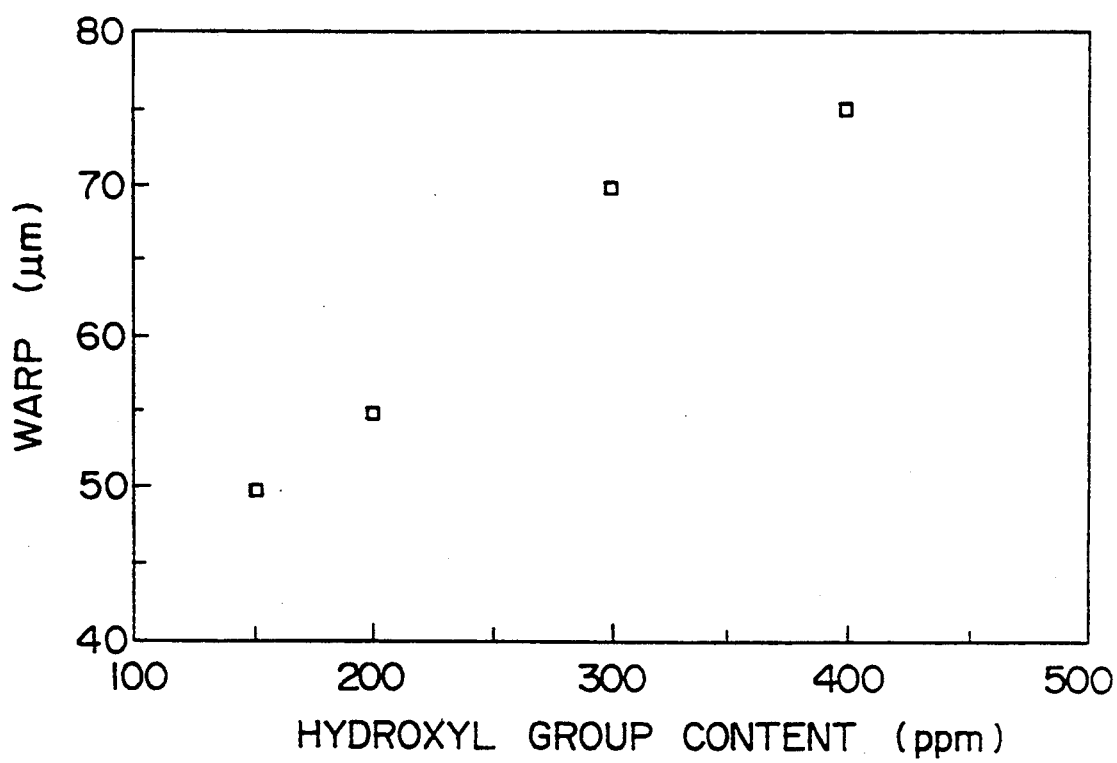
FIG. 5 is a graph showing the dependence of the warp of a substrate on the hydroxyl group content of the substrate having an active element array.

FIG. 5 is a graph showing the dependence of the warp of a quartz glass substrate on the hydroxyl group content of the quartz glass substrate. As is evident from FIG. 5, the warp of the quartz glass substrate is 60 $\mu$m or below when the hydroxyl group content of the quartz glass substrate is 200 ppm or below. Since the chlorine content of the quartz glass substrate of the present invention is suppressed to a low value, the quartz glass substrate has high heat resistance and resistant to thermal deformation. Accordingly, the thickness of the quartz glass substrate may be 1 mm or below.

Test samples of two kinds of quartz glass substrates for liquid crystal display of the present invention as examples and test samples of a prior art quartz glass substrate as a comparative example were subjected to high-temperature performance tests to evaluate the reliability. The impurity content of the test samples of the quartz glass substrates of the present invention is tabulated in Tables 4 and 5, and the impurity content of the test-samples of the prior art quartz glass substrate is tabulated in Table 6.

TABLE 4

| Impurities | Al | P | B | Na | K | Li |
|---|---|---|---|---|---|---|
| Contents (ppm) | 0.02 | <0.04 | <0.007 | <0.02 | <0.02 | <0.01 |

TABLE 5

| Impurities | Al | P | B | Na | K | Li |
|---|---|---|---|---|---|---|
| Contents (ppm) | 0.03 | <0.04 | 0.019 | 0.03 | <0.02 | <0.01 |

TABLE 6

| Impurities | Al | P | B | Na | K | Li |
|---|---|---|---|---|---|---|
| Contents (ppm) | 64.8 | <0.04 | <0.007 | 1.9 | 0.04 | 5.83 |

Figure 6:
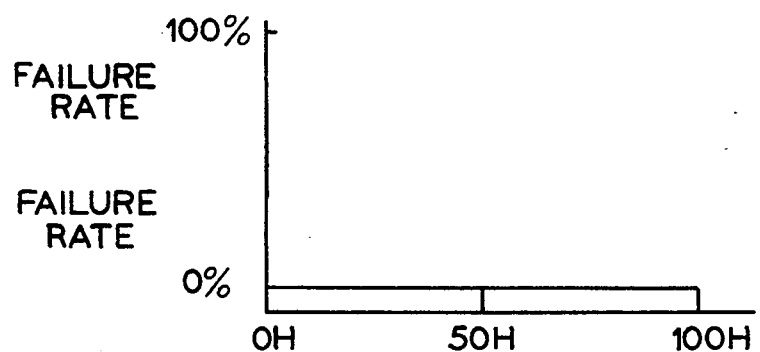
FIG. 6 is a graph showing the results of high-temperature performance test of test samples of liquid crystal displays incorporating a quartz glass substrate of the present invention.
Figure 7:
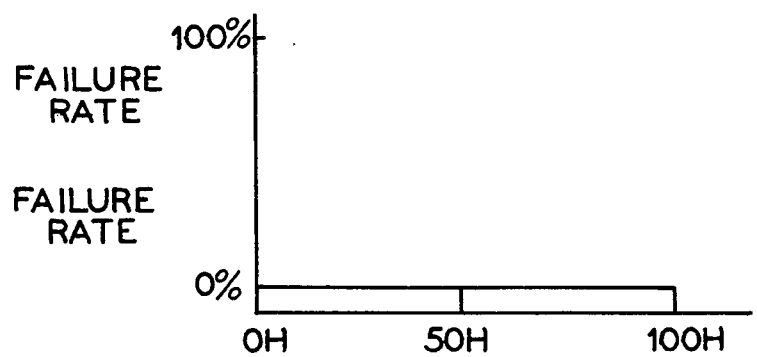
FIG. 7 is a graph showing the results of high-temperature performance test of test samples of liquid crystal displays incorporating another quartz glass substrate of the present invention.
Figure 8:
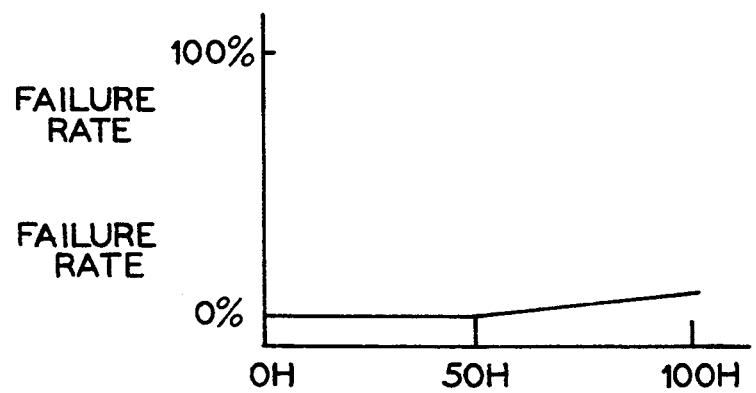
FIG. 8 is a graph showing the results of high-temperature performance test of liquid crystal displays incorporating a prior art quartz glass substrate.

Results of the high-temperature performance tests are shown in FIGS. 6, 7 and 8. FIG. 6 is a graph for the test samples of one example of the present invention, FIG. 7 is a graph for the test samples of another example of the present invention and FIG. 8 is a graph for the test samples of the comparative example of the prior art. The number of test samples of each example was two hundreds and test temperature was 50° C. As is evident from FIGS. 6, 7 and 8, failure rates in 100 hr for the test samples of the examples of the present invention were 0%, while failure rate in 100 hr for the test samples of the comparative example was 5%. Principal cause of failure was the degradation of the peripheral driving TFTs formed on the substrates. As is obvious from Tables 4, 5 and 6, reduction in the aluminum content and the sodium content improves the high-temperature performance and extends the life of the quartz glass substrate.

Although the preferred embodiment of the present invention has been described as applied to a liquid crystal display of an active matrix type employing polycrystalline silicon thin film transistors as active elements, the present invention is not limited thereto in its application. For example, the quartz glass substrate of the present invention may be used for supporting thin-film transistors formed by processing an amorphous silicon thin film and for forming a driving substrate for liquid crystal displays of a MIM type, a simple matrix type and the like. Although the foregoing embodiments use synthetic quartz glass, the quartz glass substrate of the present invention may be formed of molten quartz glass provided that the hydroxyl group content, chlorine content and aluminum content of the molten quartz glass meet conditions requires by the present invention.

As is apparent from the foregoing description, according to the present invention, the quartz glass substrate supporting the active elements is formed of synthetic quartz glass having a hydroxyl group content of 200 ppm or below and a chlorine content of 50 ppm or below. Accordingly, the quartz glass substrate has a very high heat resistance and highly resistant to thermal deformation. Moreover, since the quartz glass substrate has an aluminum content of 1 ppm or below and a sodium content of 0.1 ppm or below, the active elements formed on the quartz glass substrate have high reliability and improved electric characteristics. Thus the performance of the active elements is not affected at all by the quartz glass substrate, the active elements are able to function satisfactorily, the reliability of the active elements is improved, and the active elements are produced at a high yield.

What is claimed is:

1. A substrate having an active element array comprising:
   a glass substrate composed of synthetic quartz glass including a hydroxyl group whose concentration is 200 ppm or less and a chlorine group whose concentration is 50 ppm or less.

2. A substrate as claimed in claim 1, wherein said synthetic quartz glass includes impurities of 0.1 ppm or less of sodium and 1 ppm or less of aluminum.

3. A substrate as claimed in claim 2, wherein said active element array comprises a thin-film transistor array.

4. A substrate as claimed in claim 1, wherein said active element array comprises a thin-film transistor array.

5. An electrooptical device comprising:
   a glass substrate composed of synthetic quartz glass including a hydroxyl group whose concentration is 200 ppm or less and a chlorine group whose concentration is 50 ppm or less;
   a plurality of picture element electrodes disposed in the matrix form, each picture element electrode being associated with a switching element;
   an insulating substrate placed opposite to and spaced apart from the glass substrate; and
   an electrooptical material layer sandwiched between the glass substrate and the insulating substrate.

6. An electrooptical device as claimed in claim 5, wherein said synthetic quartz glass includes impurities of 0.1 ppm or less of sodium and 1 ppm or less of aluminum.

7. An electrooptical device as claimed in claim 5, wherein said switching element is a thin film transistor.

8. An electrooptical device as claimed in claim 7, wherein said thin-film transistor comprises a thin film of polycrystalline silicon.

9. An electrooptical device as claimed in claim 5, wherein said electrooptical material is liquid crystal.

10. An electrooptical device as claimed in claim 5, wherein said glass substrate has a thickness of 1 mm or less.

* * * * *